United States Patent
Chowdhury et al.

(10) Patent No.: US 11,615,154 B2
(45) Date of Patent: Mar. 28, 2023

(54) UNSUPERVISED CORPUS EXPANSION USING DOMAIN-SPECIFIC TERMS

(71) Applicant: International Business Machines Corporation, Armonk, NY (US)

(72) Inventors: Md Faisal Mahbub Chowdhury, Woodside, NY (US); Alfio Massimiliano Gliozzo, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/177,459

(22) Filed: Feb. 17, 2021

(65) Prior Publication Data

US 2022/0261444 A1 Aug. 18, 2022

(51) Int. Cl.
*G06F 16/00* (2019.01)
*G06F 16/951* (2019.01)
*G06F 16/9535* (2019.01)
*G06F 40/284* (2020.01)
*G06F 40/30* (2020.01)

(52) U.S. Cl.
CPC ........ *G06F 16/951* (2019.01); *G06F 16/9535* (2019.01); *G06F 40/284* (2020.01); *G06F 40/30* (2020.01)

(58) Field of Classification Search
CPC .. G06F 16/951; G06F 16/9535; G06F 40/284; G06F 40/30
See application file for complete search history.

(56) References Cited

U.S. PATENT DOCUMENTS

| | | | |
|---|---|---|---|
| 9,529,904 | B2 | 12/2016 | Anantharam |
| 10,311,058 | B1* | 6/2019 | Kumar ............... G06F 16/211 |
| 10,394,955 | B2 | 8/2019 | Fauceglia |
| 10,832,591 | B2 | 11/2020 | Byron |
| 2014/0082003 | A1 | 3/2014 | Feldman |
| 2016/0117386 | A1 | 4/2016 | Ajmera |
| 2017/0161363 | A1 | 6/2017 | Cortis |
| 2017/0228461 | A1 | 8/2017 | Lev |
| 2018/0196881 | A1 | 7/2018 | Lundin |

(Continued)

OTHER PUBLICATIONS

Balog et al., "Multi-step Classification Approaches to Cumulative Citation Recommendation", Proceedings of the 10th Conference on Open Research Areas in Information Retrieval, OAIR'13, Lisbon, Portugal, May 22-24, 2013, 8 Pages.

(Continued)

*Primary Examiner* — Paul Kim
(74) *Attorney, Agent, or Firm* — Stephanie L. Carusillo

(57) ABSTRACT

In an approach to unsupervised corpus expansion using domain-specific terms, one or more computer processors retrieve one or more domain-specific terms from a corpus of text. One or more computer processors search the World Wide Web for the one or more domain-specific terms to produce a plurality of web pages associated with each of the one or more domain-specific terms. One or more computer processors determine a confidence score for each of the plurality of web pages. One or more computer processors determine the confidence score of at least one of the plurality of web pages exceeds a pre-defined threshold. One or more computer processors add the at least one of the plurality of web pages to the corpus of text.

18 Claims, 4 Drawing Sheets

(56) References Cited

U.S. PATENT DOCUMENTS

2019/0303375 A1\* 10/2019 Bai .................. G06F 16/24578
2021/0191995 A1\* 6/2021 Bennett ................ G06F 16/313

OTHER PUBLICATIONS

Gallagher et al., "Leveraging Large Corpora using Internet Search for Question Answering", 2016 IEEE/WIC/ACM International Conference on Web Intelligence (WI), Omaha, Nebraska, USA, Oct. 13-16, 2016, 4 Pages.

Mihindukulasooriya et al., "Knowledge Induction Using Corpus Expansion", IBM U.S. Appl. No. 17/008,856, filed Sep. 1, 2020, 57 Pages.

Remus et al., "Domain-Specific Corpus Expansion with Focused Webcrawling", Proceedings of the Tenth International Conference on Language Resources and Evaluation (LREC'16), European Language Resources Association (ELRA), pp. 3607-3611, May 2016, 5 Pages.

Sherman et al., "Document Expansion Using External Collections", SIGIR'17: Proceedings of the 40th International ACM SIGIR Conference on Research and Development in Information Retrieval, Shinjuku, Tokyo, Japan, pp. 1045-1048, Aug. 7-11, 2017, 4 Pages.

Weggersen et al., "Knowledge Base Acceleration Using Features Inspired by Collaborative Filtering", MS thesis, Norwegian University of Science and Technology, NTNU, Jun. 2017, 130 Pages.

\* cited by examiner

UNSUPERVISED CORPUS EXPANSION USING DOMAIN-SPECIFIC TERMS

BACKGROUND OF THE INVENTION

The present invention relates generally to the field of machine learning, and more particularly to unsupervised corpus expansion using domain-specific terms.

Unsupervised learning is a type of machine learning that looks for previously undetected patterns in a data set with no pre-existing labels and with a minimum of human supervision. In contrast to supervised learning, which makes use of human-labelled data, unsupervised learning, also known as self-organization, allows for modeling of probability densities over inputs. Unsupervised learning forms one of the three main categories of machine learning, along with supervised and reinforcement learning.

Natural language processing (NLP) is a field of computer science, artificial intelligence, and linguistics concerned with the interactions between computers and human (natural) languages. As such, natural language processing is related to the area of human—computer interaction. Many challenges in natural language processing involve natural language understanding, that is, enabling computers to derive meaning from human or natural language input.

From fine-tuning pre-trained embedding models to automatically extracting quality knowledge and exploiting the models in further higher-level applications (e.g., question answering, reasoning, etc.), quality domain-specific text attuned to a specific use-case is essential. Those skilled in the art will understand that knowledge induction from a corpus of text may be difficult if the corpus is too small and/or if the corpus is not of a sufficient quality (e.g., the corpus is a chat log). For example, a system may be configured with a corpus based on public troubleshooting documents. However, such a system may utilize a relatively small corpus size (e.g., approximately 4,000 documents occupying 6 MB). Such a corpus size may be relatively small compared to other systems that utilize a much larger corpus size (e.g., another system may use approximately 55,000 documents occupying 75 MB while yet another system may use approximately 212,000 documents occupying 768 MB). The corpus being used by the system may also not use fully natural language, such as being formatted in lists, commands, logs, tables, presentation slides, chat conversations, etc. Some relevant terms in the corpus for the system may also have very low frequencies where product names may appear only once in a single issue.

SUMMARY

A first aspect of the present invention discloses a method including one or more computer processors retrieving one or more domain-specific terms from a corpus of text. One or more computer processors search the World Wide Web for the one or more domain-specific terms to produce a plurality of web pages associated with each of the one or more domain-specific terms. One or more computer processors determine a confidence score for each of the plurality of web pages. One or more computer processors determine the confidence score of at least one of the plurality of web pages exceeds a pre-defined threshold. One or more computer processors add the at least one of the plurality of web pages to the corpus of text. The present invention has the advantage of performing a search on domain-specific terms extracted from the user corpus which ensures that the retrieved information is coherent with the original corpus. The present invention also has the advantage of not relying specifically on knowledge bases or hyperlinked entities within retrieved articles.

A second aspect of the present invention discloses a computer program product including one or more computer readable storage media and program instructions collectively stored on the one or more computer readable storage media. The stored program instructions include program instructions to retrieve one or more domain-specific terms from a corpus of text. The stored program instructions include program instructions to search the World Wide Web for the one or more domain-specific terms to produce a plurality of web pages associated with each of the one or more domain-specific terms. The stored program instructions include program instructions to determine a confidence score for each of the plurality of web pages. The stored program instructions include program instructions to determine the confidence score of at least one of the plurality of web pages exceeds a pre-defined threshold. The stored program instructions include program instructions to add the at least one of the plurality of web pages to the corpus of text.

A third aspect of the present invention disclose a computer system including one or more computer processors and one or more computer readable storage media, where program instructions are collectively stored on the one or more computer readable storage media. The stored program instructions include program instructions to retrieve one or more domain-specific terms from a corpus of text. The stored program instructions include program instructions to search the World Wide Web for the one or more domain-specific terms to produce a plurality of web pages associated with each of the one or more domain-specific terms. The stored program instructions include program instructions to determine a confidence score for each of the plurality of web pages. The stored program instructions include program instructions to determine the confidence score of at least one of the plurality of web pages exceeds a pre-defined threshold. The stored program instructions include program instructions to add the at least one of the plurality of web pages to the corpus of text.

In another aspect, the present invention discloses a method including one or more computer processors extract the one or more domain-specific terms from the corpus of text. One or more computer processors rank the one or more extracted domain-specific terms. Based on the ranking, one or more computer processors create a ranked list of the one or more domain-specific terms. One or more computer processors extract one or more highest ranked domain-specific terms from the ranked list. One or more computer processors store the one or more of the highest ranked domain-specific terms from the ranked list.

DETAILED DESCRIPTION

Embodiments of the present invention recognize that corpus quality may be improved by providing an unsupervised system that automatically constructs relevant domain-specific knowledge to expand a corpus, regardless of the size or quality of the original corpus. Embodiments of the present invention also recognize that the usage of domain-specific terms ensures that retrieved information is coherent with the original corpus. Implementation of embodiments of the invention may take a variety of forms, and exemplary implementation details are discussed subsequently with reference to the Figures.

Figure 1:
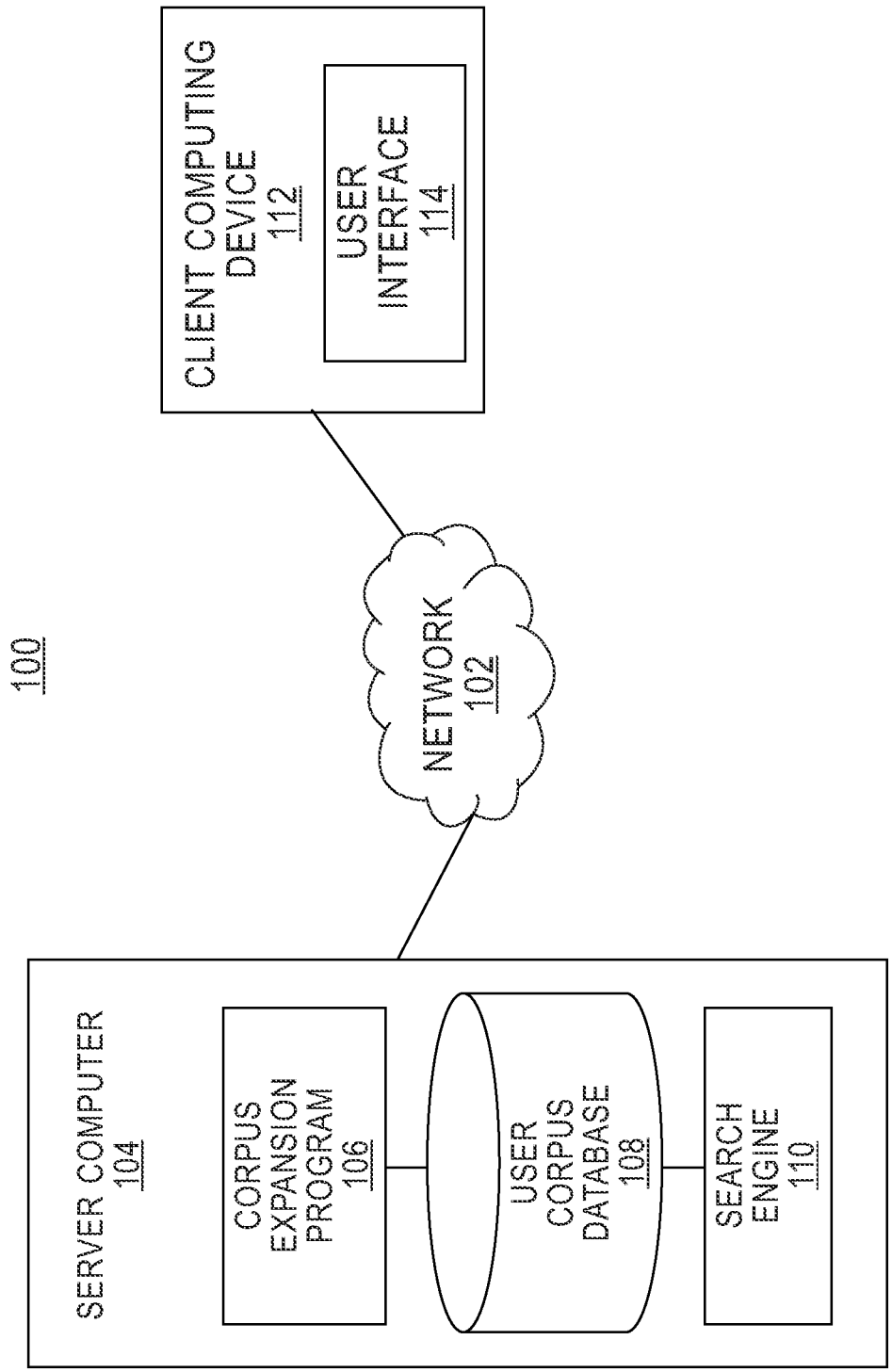
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 112 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 112, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 112 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes corpus expansion program 106, user corpus database 108, and search engine 110. Server computer 104 may include internal and external hardware components, as depicted and described in further detail with respect to FIG. 4.

Corpus expansion program 106 expands a user corpus of text by automatically, i.e., without supervision, extracting domain-specific terms as seeds, i.e., preferred search terms derived by corpus expansion program 106 from the user-provided corpus, for search queries to crawl relevant pages from the Web. Corpus expansion program 106 also uses the seeds to filter pages from the crawled pages. Corpus expansion program 106 extracts seeds by first extracting domain-specific terms from a user corpus and ranking the extracted terms based on the importance of the terms to the corpus. Corpus expansion program 106 determines whether any of the domain-specific terms is a sub-term of another term. If a term is a sub-term, then corpus expansion program 106 determines whether the sub-term has a higher ranking than the first term, and, if so, removes the first term from the ranked list. Corpus expansion program 106 extracts seeds from the top-ranked terms and stores the seeds for future queries.

Corpus expansion program 106 expands the user corpus by first retrieving the seeds and crawling top-ranked web pages using each seed as a query. Corpus expansion program 106 determines a confidence score for each web page. If the confidence score exceeds a threshold, then corpus expansion program 106 adds the associated web page to the user corpus and stores the expanded corpus. Corpus expansion program 106 is depicted and described in further detail with respect to FIG. 2 and FIG. 3.

User corpus database 108 stores information used and generated by corpus expansion program 106. In the depicted embodiment, user corpus database 108 resides on server computer 104. In another embodiment, user corpus database 108 may reside elsewhere within distributed data processing environment 100, provided that corpus expansion program 106 has access to user corpus database 108. A database is an organized collection of data. User corpus database 108 can be implemented with any type of storage device capable of storing data and configuration files that can be accessed and utilized by corpus expansion program 106, such as a database server, a hard disk drive, or a flash memory. User corpus database 108 stores one or more corpora provided by a user of client computing device 112. User corpus database 108 also stores data retrieved via search engine 110 that corpus expansion program 106 combines with the one or more user-provided corpora. User corpus database 108 also stores one or more pre-defined confidence thresholds for comparison of web pages. User corpus database 108 also stores one or more pre-defined stop criteria for the corpus expansion process.

The present invention may contain various accessible data sources, such as user corpus database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Corpus expansion program 106 enables the authorized and secure processing of personal data. Corpus expansion program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Corpus expansion program 106 provides information regarding personal data and the nature (e.g., type, scope, purpose, duration, etc.) of the processing. Corpus expansion program 106 provides the user with copies of stored personal data. Corpus expansion program 106 allows the correction or completion of incorrect or incomplete personal data. Corpus expansion program 106 allows the immediate deletion of personal data.

Search engine 110 represents one or more of a plurality of software systems that are designed to carry out web searches (i.e., Internet searches), which means to search the World Wide Web in a systematic way for particular information specified in a textual web search query. The search results are generally presented in a line of results, often referred to as search engine results pages (SERPs). The information may be a mix of links to web pages, images, videos, infographics, articles, research papers, and other types of files. Some search engines also mine data available in databases or open directories. Unlike web directories, which are maintained by human editors, search engines also maintain real-time information by running an algorithm on a web crawler.

Client computing device 112 can be one or more of a laptop computer, a tablet computer, a smart phone, smart watch, a smart speaker, or any programmable electronic device capable of communicating with various components and devices within distributed data processing environment 100, via network 102. Client computing device 112 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, client computing device 112 may be integrated into a vehicle of the user. For example, client computing device 112 may include a heads-up display in the windshield of the vehicle. In general, client computing device 112 represents one or more programmable electronic devices or combination of programmable electronic devices capable of executing machine readable program instructions and communicating with other computing devices (not shown) within distributed data processing environment 100 via a network, such as network 102. Client computing device 112 includes an instance of user interface 114.

User interface 114 provides an interface between corpus expansion program 106 on server computer 104 and a user of client computing device 112. In one embodiment, user interface 114 is mobile application software. Mobile application software, or an "app," is a computer program designed to run on smart phones, tablet computers and other mobile devices. In one embodiment, user interface 114 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 114 enables a user of client computing device 112 to provide a corpus of text to be expanded by corpus expansion program 106. User interface 114 also enables a user of client computing device 112 to provide preferences, thresholds, and/or criteria for use by corpus expansion program 106.

Figure 2:
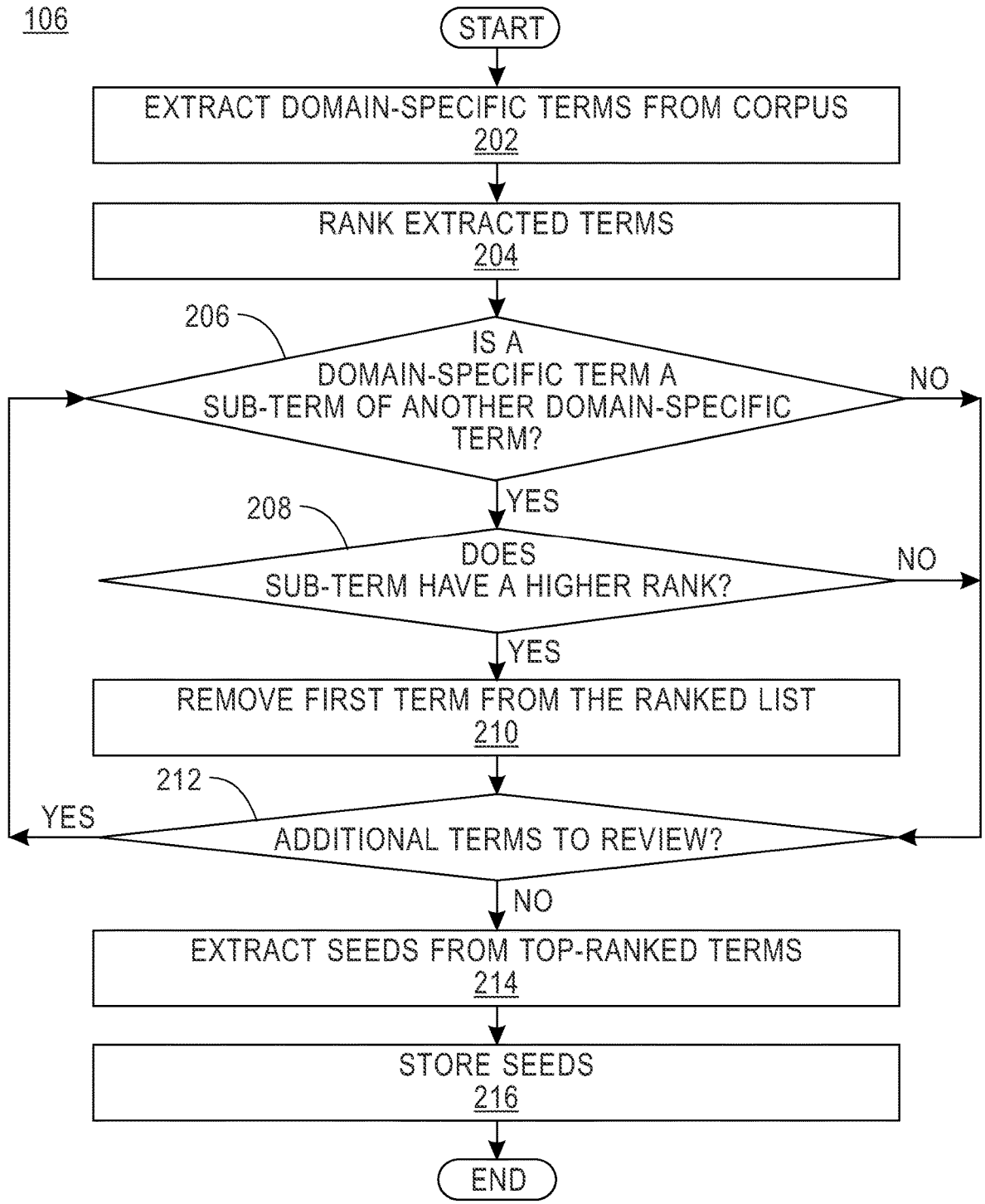
FIG. 2 is a flowchart depicting operational steps of a corpus expansion program, on a server computer within the distributed data processing environment of FIG. 1, for seed selection in preparation for corpus expansion, in accordance with an embodiment of the present invention.

FIG. 2 is a flowchart depicting operational steps of corpus expansion program 106, on server computer 104 within distributed data processing environment 100 of FIG. 1, for seed selection in preparation for corpus expansion, in accordance with an embodiment of the present invention.

Corpus expansion program 106 extracts domain-specific terms from a corpus (step 202). In an embodiment, corpus expansion program 106 receives a user corpus from a user of client computing device 112 via user interface 114. In another embodiment, the user of client computing device 112 stores the corpus in user corpus database 108, via user interface 114, and corpus expansion program 106 retrieves the corpus from user corpus database 108. In an embodiment, corpus expansion program 106 uses one or more natural language processing (NLP) techniques to extract domain-specific terms from the corpus. For example, corpus expansion program 106 may extract terms using a noun phrase chunker. In another example, corpus expansion program 106 may extract verbs, or other types of words, as domain-specific terms.

Corpus expansion program 106 ranks the extracted terms (step 204). In an embodiment, corpus expansion program 106 uses one or more known algorithms to rank the extracted domain-specific terms based on the importance of the terms to the corpus. For example, importance may be determined based on frequency of occurrence, subject matter associated with the title of the corpus, etc. In an embodiment, corpus expansion program 106 creates a ranked list of terms, where the top-ranked terms are the most important to the corpus.

Corpus expansion program 106 determines whether an extracted domain-specific term is a sub-term of another domain-specific term (decision block 206). In an embodiment, corpus expansion program 106 reviews the ranked terms one at a time and determines whether any of the terms is a sub-term of any of the other terms in the ranked list using one or more efficient algorithms. For example, corpus expansion program 106 may use terminological bucket indexing (TBI) for indexing and retrieval of nested terms, i.e., sub-terms, and/or super terms. For example, given a term "X," corpus expansion program 106 reviews the ranked list of domain-specific terms and determines other terms that include term "X" and/or other terms that "X" includes.

If corpus expansion program 106 determines a term is a sub-term of another term ("yes" branch, decision block 206), then corpus expansion program 106 determines whether the sub-term has a higher rank (decision block 208). In an embodiment, corpus expansion program 106 compares the ranking of the sub-term to the ranking of the first term to determine which has the higher ranking in the ranked list.

If corpus expansion program 106 determines the sub-term has a higher rank ("yes" branch, decision block 208), then corpus expansion program 106 removes the first term from the ranked list (step 210). In an embodiment, if corpus expansion program 106 determines that a sub-term of a first term is ranked higher in the ranked list of domain-specific terms, then corpus expansion program 106 replaces the first term in the list with the sub-term by removing or deleting the first term from the list. While corpus expansion program 106 removes the first term from the ranked list, corpus expansion program 106 does not remove the first term from the user corpus.

Responsive to determining an extracted domain-specific term is not a sub-term of another domain-specific term ("no" branch, decision block 206), or responsive to determining the sub-term does not have a higher rank ("no" branch, decision block 208), or responsive to replacing the first term with the sub-term in the ranked list, corpus expansion program 106 determines whether there are any additional terms in the ranked list to review (decision block 212). If corpus expansion program 106 determines there are additional terms in the ranked list to review ("yes" branch, decision block 212), then corpus expansion program 106 returns to decision block 206.

If corpus expansion program 106 determines there are no additional terms in the ranked list to review ("no" branch, decision block 212), then corpus expansion program 106 extracts seeds from the top-ranked terms (step 214). In an embodiment, corpus expansion program 106 determines a threshold number of terms to extract as seeds from the ranked list. For example, corpus expansion program 106 may extract the top ten percent of the ranked terms. In one embodiment, corpus expansion program 106 receives the value of the threshold from the user of client computing device 112, via user interface 114. In another embodiment, the threshold value is a default number set by a system administrator. In a further embodiment, corpus expansion program 106 determines the threshold value based on historical threshold values. In general, the value of the threshold depends on the size of the corpus and/or the quality of the corpus and may be different for each iteration of the method.

Corpus expansion program 106 stores the seeds (step 216). In an embodiment, corpus expansion program 106 stores the extracted seeds in user corpus database 108 for retrieval and use in expanding the user corpus.

Figure 3:
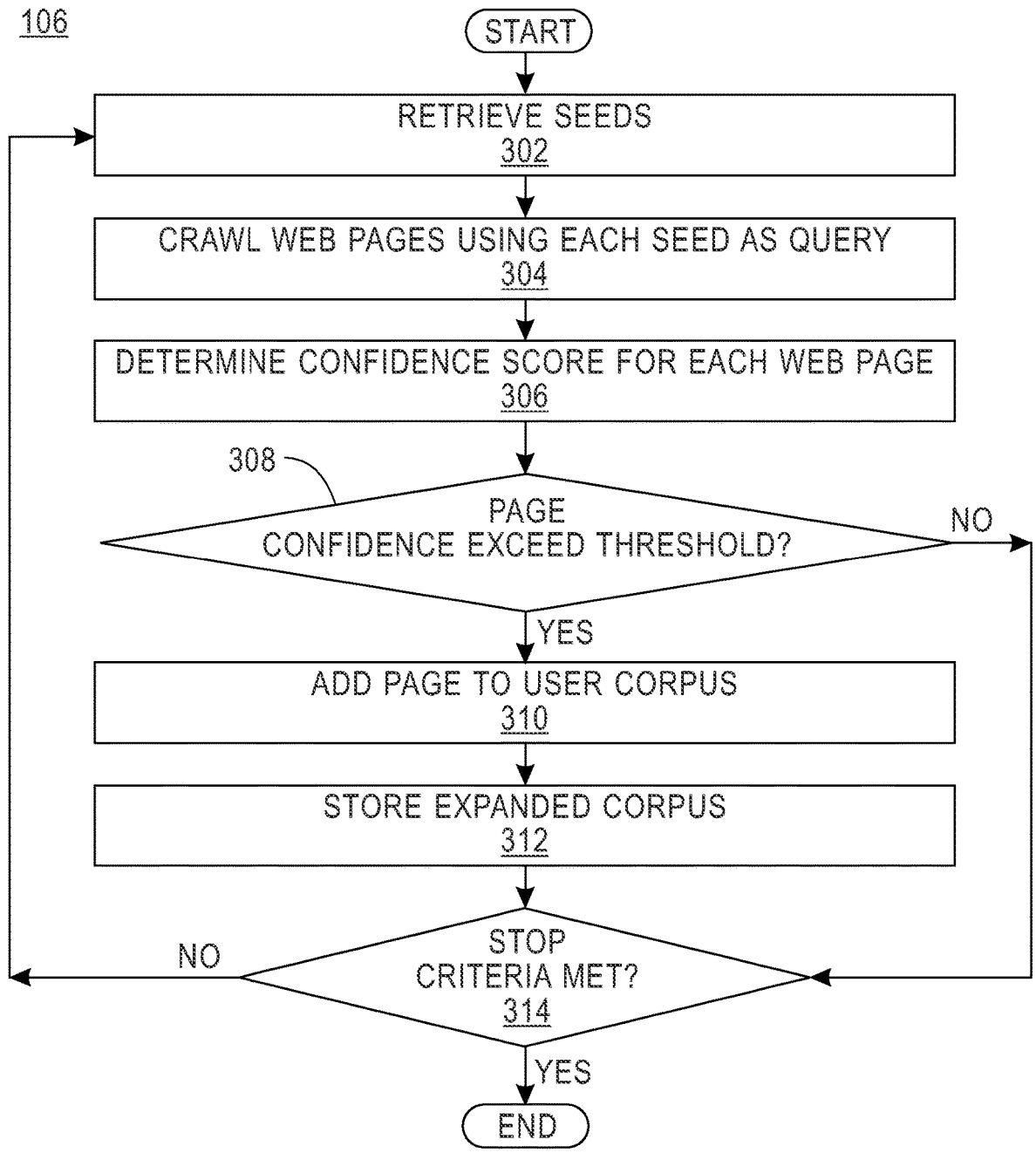
FIG. 3 is a flowchart depicting operational steps of the corpus expansion program, on the server computer within the distributed data processing environment of FIG. 1, for corpus expansion using domain-specific terms, in accordance with an embodiment of the present invention.

FIG. 3 is a flowchart depicting operational steps of corpus expansion program 106, on server computer 104 within distributed data processing environment 100 of FIG. 1, for corpus expansion using domain-specific terms, in accordance with an embodiment of the present invention.

Corpus expansion program 106 retrieves seeds (step 302). In an embodiment, corpus expansion program 106 retrieves one or more seeds from user corpus database 108. In another embodiment, corpus expansion program 106 receives seeds directly from the user of client computing device 112 via user interface 114. The seeds are domain-specific terms that corpus expansion program 106 uses in the process of expanding the user corpus, as will be described below.

Corpus expansion program 106 crawls web pages using each seed as a query (step 304). In an embodiment, corpus expansion program 106 uses a known search engine application programming interface (API) to interface with search engine 110 to crawl one or more web pages using each of the seeds as a query. An advantage of the embodiment is that it does not treat each document in the user corpus as an individual query, thus simplifying the method. In the embodiment, corpus expansion program 106 performs a search for each seed, one at a time, in search engine 110. An advantage of the embodiment is that performing a search on domain-specific terms extracted from the user corpus ensures that the retrieved information is coherent with the original corpus. In an embodiment, search engine 110 produces a plurality of web pages as a set of search results for each seed query, and corpus expansion program 106 crawls a pre-defined quantity of the produced web pages. For example, the user of client computing device 112, a system administrator, or corpus expansion program 106 may define the pre-defined quantity as the top ten search results. In an embodiment, corpus expansion program 106 uses search engine 110 to search the open Web. In another embodiment, corpus expansion program 106 uses search engine 110 to search a specific, targeted collection of web pages. An advantage of the embodiment is that the process does not rely specifically on knowledge bases or hyperlinked entities within retrieved articles.

Corpus expansion program 106 determines a confidence score for each web page (step 306). In an embodiment, corpus expansion program 106 determines a confidence score for each web page in the set of search results produced by search engine 110. For example, corpus expansion program 106 may score each web page based on a number of domain-specific terms, i.e., seeds, for which the page appeared in the search results. In another example, corpus expansion program 106 may score each web page based on a measure of similarity between the web page and one or more documents in the user corpus. By determining a confidence score for each web page, corpus expansion program 106 determines whether the web page is relevant to the user corpus.

Corpus expansion program 106 determines whether the web page confidence score exceeds a threshold (decision block 308). In an embodiment, corpus expansion program 106 determines whether the confidence score of each web page exceeds a pre-defined minimum score that indicates relevance of the web page to the user corpus, where the pre-defined minimum score is defined by the user of client computing device 112, a system administrator, or corpus expansion program 106. For example, corpus expansion program 106 determines whether a web page is included in the set of search results for at least a pre-defined number of terms/seeds.

If corpus expansion program 106 determines that the web page confidence score exceeds a threshold ("yes" branch, decision block 308), then corpus expansion program 106 adds the web page to the user corpus (step 310). In an embodiment, if the web page confidence score exceeds the pre-defined threshold, then corpus expansion program 106 adds the web page the user corpus, thus producing an expanded corpus. Advantages of the embodiment is that the process is automatic and unsupervised, thus, not requiring input or involvement of a subject matter expert, and the process is relatively inexpensive to run.

Corpus expansion program 106 stores the expanded corpus (step 312). In an embodiment, corpus expansion program 106 stores the expanded corpus in user corpus database 108.

Responsive to storing the expanded corpus, or if corpus expansion program 106 determines the web page confidence score does not exceed a threshold ("no" branch, decision block 308), then corpus expansion program 106 determines whether a stop criteria is met (decision block 314). In an embodiment, a user of client computing device 112 or a system administrator determines a stop criteria for the corpus expansion process. In an embodiment, the stop criteria is stored in user corpus database 108. In an embodiment, corpus expansion program 106 determines whether the stop criteria for the corpus has been met by the searches that have already been performed. For example, a stop criteria may be that the size of the expanded corpus is greater than a pre-defined number of megabytes. In another example, the stop criteria may be that the size of the expanded corpus is greater than a pre-defined number of pages.

If corpus expansion program 106 determines a stop criteria is not met ("no" branch, decision block 314), then corpus expansion program 106 returns to step 302 to retrieve one or more additional seeds. If corpus expansion program 106 determines a stop criteria is met ("yes" branch, decision block 314), then corpus expansion program 106 completes execution. An advantage of the embodiment is that it does not require the use of language models, as would existing methods. Another advantage of the embodiment is that it is not based on question answering techniques, as are existing methods.

Figure 4:
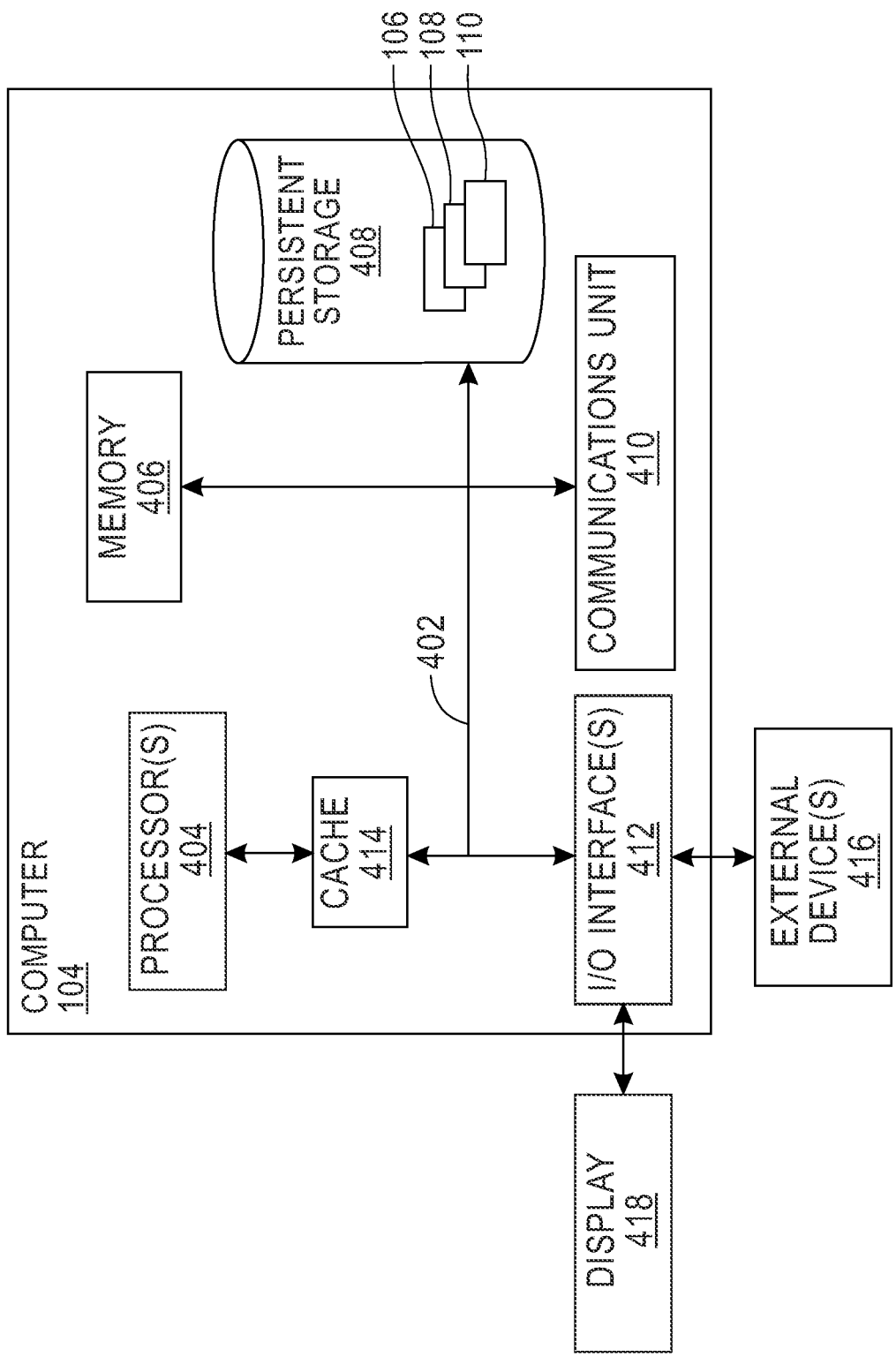
FIG. 4 depicts a block diagram of components of the server computer executing the corpus expansion program within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., corpus expansion program 106, user corpus database 108, and search engine 110, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of user computing device 112. In these examples, communications unit 410 includes one or more network interface cards. Communications unit 410 may provide communications through the use of either or both physical and wireless communications links. Corpus expansion program 106, user corpus database 108, search engine 110, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., corpus expansion program 106, user corpus database 108, and search engine 110 on server computer 104, can be stored on such portable computer readable storage media and can be loaded onto persistent storage 408 via I/O interface(s) 412. I/O interface(s) 412 also connect to display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
retrieving, by one or more computer processors, one or more domain-specific terms from a corpus of text;
searching, by one or more computer processors, World Wide Web for the one or more domain-specific terms to produce a plurality of web pages associated with each of the one or more domain-specific terms;
determining, by one or more computer processors, a confidence score for each of the plurality of web pages;
determining, by one or more computer processors, the confidence score of at least one of the plurality of web pages exceeds a pre-defined threshold;
adding, by one or more computer processors, the at least one of the plurality of web pages to the corpus of text;
responsive to adding the at least one of the plurality of web pages to the corpus of text, determining, by one or more computer processors, a size of the corpus of text;
retrieving, by one or more computer processors, a stop criteria for an expansion of the corpus of text; and
based on the size of the corpus of text, determining, by one or more computer processors, the stop criteria for the expansion of the corpus of text is met.

2. The computer-implemented method of claim 1, wherein determining the confidence score for each of the plurality of web pages is based on at least one of: a number of the domain-specific terms for which each of the plurality of web pages appeared in a search result and a measure of similarity between each of the plurality of web pages and one or more documents in the corpus of text.

3. The computer-implemented method of claim 1, further comprising:
   extracting, by one or more computer processors, the one or more domain-specific terms from the corpus of text;
   ranking, by one or more computer processors, the one or more extracted domain-specific terms;
   based on the ranking, creating, by one or more computer processors, a ranked list of the one or more domain-specific terms;
   extracting, by one or more computer processors, one or more highest ranked domain-specific terms from the ranked list; and
   storing, by one or more computer processors, the one or more of the highest ranked domain-specific terms from the ranked list.

4. The computer-implemented method of claim 3, further comprising:
   determining, by one or more computer processors, a first term of the one or more extracted domain-specific terms is a sub-term of a second term of the extracted domain-specific terms;
   determining, by one or more computer processors, the first term is ranked higher than the second term; and
   removing, by the one or more computer processor, the second term from the ranked list.

5. The computer-implemented method of claim 3, wherein extracting the one or more highest ranked domain-specific terms from the ranked list further comprises:
   determining, by one or more computer processors, a threshold number of domain-specific terms to extract from the ranked list.

6. The computer-implemented method of claim 3, wherein extracting the one or more domain-specific terms from the corpus of text further comprises:
   using, by one or more computer processors, one or more natural language processing techniques to extract the one or more domain-specific terms from the corpus of text.

7. A computer program product comprising:
   one or more computer readable storage media and program instructions collectively stored on the one or more computer readable storage media, the stored program instructions comprising:
   program instructions to retrieve one or more domain-specific terms from a corpus of text;
   program instructions to search World Wide Web for the one or more domain-specific terms to produce a plurality of web pages associated with each of the one or more domain-specific terms;
   program instructions to determine a confidence score for each of the plurality of web pages;
   program instructions to determine the confidence score of at least one of the plurality of web pages exceeds a pre-defined threshold;
   program instructions to add the at least one of the plurality of web pages to the corpus of text;
   responsive to adding the at least one of the plurality of web pages to the corpus of text, program instructions to determine a size of the corpus of text;
   program instructions to retrieve a stop criteria for an expansion of the corpus of text; and
   based on the size of the corpus of text, program instructions to determine the stop criteria for the expansion of the corpus of text is met.

8. The computer program product of claim 7, wherein the program instructions to determine the confidence score for each of the plurality of web pages are based on at least one of: a number of the domain-specific terms for which each of the plurality of web pages appeared in a search result and a measure of similarity between each of the plurality of web pages and one or more documents in the corpus of text.

9. The computer program product of claim 7, the stored program instructions further comprising:
   program instructions to extract the one or more domain-specific terms from the corpus of text;
   program instructions to rank the one or more extracted domain-specific terms;
   based on the ranking, program instructions to create a ranked list of the one or more domain-specific terms;
   program instructions to extract one or more highest ranked domain-specific terms from the ranked list; and
   program instructions to store the one or more of the highest ranked domain-specific terms from the ranked list.

10. The computer program product of claim 9, the stored program instructions further comprising:
    program instructions to determine a first term of the one or more extracted domain-specific terms is a sub-term of a second term of the extracted domain-specific terms;
    program instructions to determine the first term is ranked higher than the second term; and
    program instructions to remove the second term from the ranked list.

11. The computer program product of claim 9, wherein the program instructions to extract the one or more highest ranked domain-specific terms from the ranked list comprise:
    program instructions to determine a threshold number of domain-specific terms to extract from the ranked list.

12. The computer program product of claim 9, wherein the program instructions to extract the one or more domain-specific terms from the corpus of text comprise:
    program instructions to use one or more natural language processing techniques to extract the one or more domain-specific terms from the corpus of text.

13. A computer system comprising:
    one or more computer processors;
    one or more computer readable storage media;
    program instructions collectively stored on the one or more computer readable storage media for execution by at least one of the one or more computer processors, the stored program instructions comprising:
    program instructions to retrieve one or more domain-specific terms from a corpus of text;
    program instructions to search World Wide Web for the one or more domain-specific terms to produce a plurality of web pages associated with each of the one or more domain-specific terms;
    program instructions to determine a confidence score for each of the plurality of web pages;
    program instructions to determine the confidence score of at least one of the plurality of web pages exceeds a pre-defined threshold;
    program instructions to add the at least one of the plurality of web pages to the corpus of text;
    responsive to adding the at least one of the plurality of web pages to the corpus of text, program instructions to determine a size of the corpus of text;

program instructions to retrieve a stop criteria for an expansion of the corpus of text; and based on the size of the corpus of text, program instructions to determine a stop criteria for an expansion of the corpus of text is met.

14. The computer system of claim 13, wherein the program instructions to determine the confidence score for each of the plurality of web pages are based on at least one of: a number of the domain-specific terms for which each of the plurality of web pages appeared in a search result and a measure of similarity between each of the plurality of web pages and one or more documents in the corpus of text.

15. The computer system of claim 13, the stored program instructions further comprising:

program instructions to extract the one or more domain-specific terms from the corpus of text;

program instructions to rank the one or more extracted domain-specific terms;

based on the ranking, program instructions to create a ranked list of the one or more domain-specific terms;

program instructions to extract one or more highest ranked domain-specific terms from the ranked list; and program instructions to store the one or more of the highest ranked domain-specific terms from the ranked list.

16. The computer system of claim 15, the stored program instructions further comprising:

program instructions to determine a first term of the one or more extracted domain-specific terms is a sub-term of a second term of the extracted domain-specific terms;

program instructions to determine the first term is ranked higher than the second term; and program instructions to remove the second term from the ranked list.

17. The computer system of claim 15, wherein the program instructions to extract the one or more highest ranked domain-specific terms from the ranked list comprise:

program instructions to determine a threshold number of domain-specific terms to extract from the ranked list.

18. The computer system of claim 15, wherein the program instructions to extract the one or more domain-specific terms from the corpus of text comprise:

program instructions to use one or more natural language processing techniques to extract the one or more domain-specific terms from the corpus of text.

* * * * *